United States Patent Office.

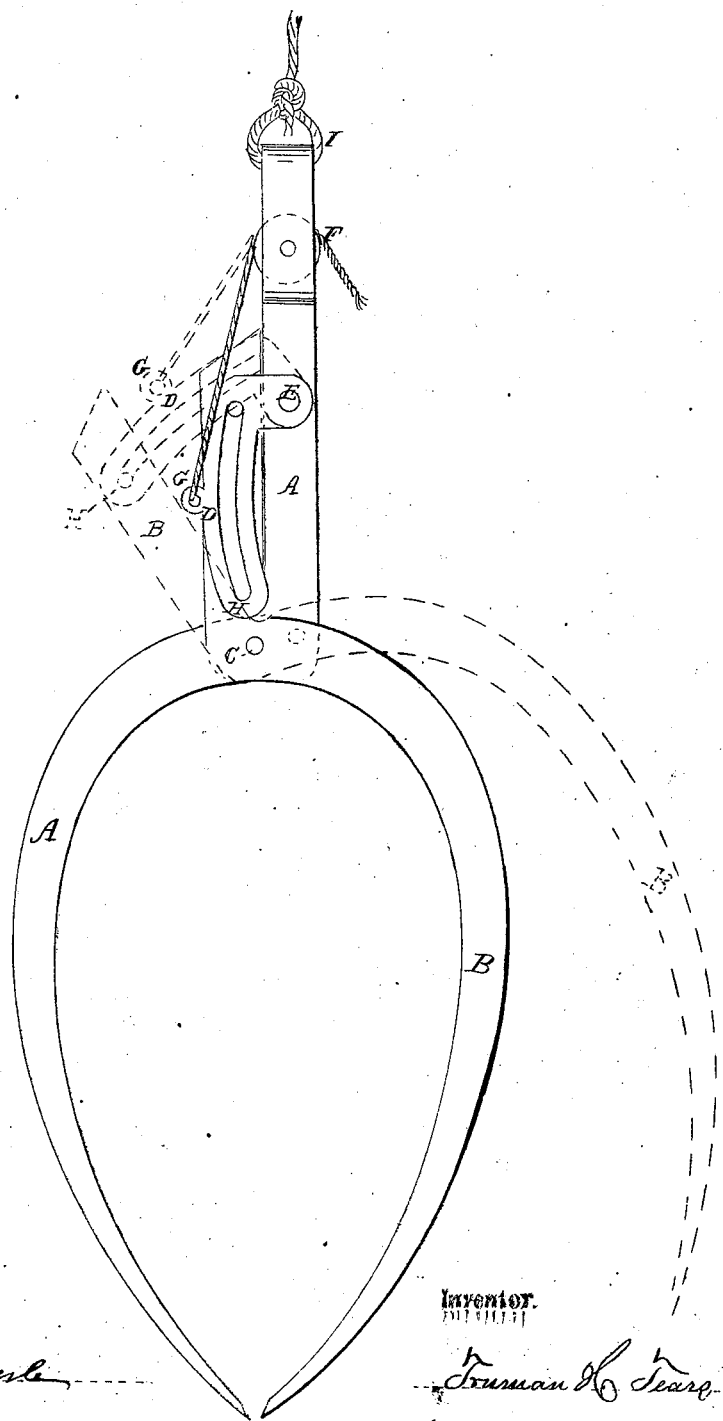

TRUMAN H. TEARS, OF LE ROY, PENNSYLVANIA.

Letters Patent No. 76,550, dated April 7, 1868.

IMPROVEMENT IN HORSE HAY-FORKS.

*The Schedule referred to in these Letters Patent and making part of the same.*

TO ALL WHOM IT MAY CONCERN:

Be it known that I, TRUMAN H. TEARS, of Le Roy, in the county of Bradford, and in the State of Pennsylvania, have invented an Improvement in Hay-Forks; and do hereby declare that the following is a full, clear, and exact description thereof, reference being had to the accompanying drawings, making a part of this specification, in which the red lines show the fork as open and ready to clutch the hay, and the black lines show it when closed and locked in proper position for holding the hay.

A and B represent the arms of the fork united in the usual manner by a movable joint, at C.

D represents a link, used for opening and closing the arms A and B, and, also, for locking them together when holding hay. It is pivoted at E, and raised or lowered by means of a cord passing over the pulley F and attached to the link at G.

H is a pin, fastened to the arm B, and working in the link D, by means of which the arms may be opened or closed. The whole is suspended at I, in the usual manner.

To use this fork, the link D is raised by means of the cord, opening the arms A and B. The fork is then dropped into the hay, and the arms closed, and firmly locked by pressing the link downward, holding between them the hay, which may then be raised to the desired height, when, by pulling upon the cord, the link is raised, opening the arms, and releasing the hay.

The advantages possessed by this fork over all others in use, are that it is more simple and easy of construction, can be furnished at less cost, and is more durable.

What I claim as my invention, and desire to secure by Letters Patent, is—

The arms A and B, when constructed in the manner and for the purpose substantially as herein set forth.

I also claim the combination of the arms A and B, link D, pulley F, and pin H, for the purpose and substantially as herein described.

In testimony that I claim the foregoing, I have hereunto set my hand, this 28th day of February, 1868.

TRUMAN H. TEARS.

Witnesses:
   J. P. BUST,
   A. M. BRIGHAM.